Patented May 7, 1940

2,199,633

UNITED STATES PATENT OFFICE 2,199,633

PROCESS FOR THE SYNTHESIS OF CHLORINATED, UNSATURATED HYDROCARBONS

Herman B. Kipper, Accord, Mass.

No Drawing. Application July 1, 1938,
Serial No. 217,021

3 Claims. (Cl. 260—654)

In my co-pending application, Serial No. 89,463, processing is described for the synthesis of chlorinated, unsaturated hydrocarbons by simultaneous oxidation and chlorination of various grades of petroleum hydrocarbons, condensed olefines, etc.

I have carried out similar syntheses of chlorinated, unsaturated hydrocarbons by the action of hydrochloric and nitric acids on petroleum hydrocarbons and with the aid of powerful stirring during the carrying out of reaction.

For instance, one thousand grams of a heavy so-called No. 2 house fuel oil was heated to about seventy degrees C. and one hundred and fifty grams of a 1.20 specific gravity hydrochloric acid was added to the vessel containing the oil. About seventy-five grams of a 1.5 specific gravity fuming nitric acid was then added to the reaction vessel or beaker slowly, or during a period of about an hour. Thorough stirring of the contents was maintained during the carrying out of reaction. Considerable heat is developed and some fairly hard tar or resin-like products are produced in the oil being treated.

Similar work was repeated with kerosene, gasoline, lighter fuel oils and oil condensed from olefinic hydrocarbons. A number of experiments were also carried out in treating chlorinated oils made by direct chlorination through subjecting them to the oxidizing treatments produced by nitric acid but without the use of hydrochloric acid. For instance, a heavy fuel oil chlorinated with about twenty percent of chlorine was subjected to oxidation by ten percent of fuming nitric acid at about seventy degrees during an hour period under thorough stirring. If the reaction vessel were cooled, the treatment period might of course be shortened.

Chlorination and oxidation were also produced by passing chlorine into the fuel oil and adding nitric acid simultaneously. About fifteen percent of chlorine was passed through the heavy fuel oil of the grade noted and about eight percent of fuming nitric acid was simultaneously added during about one hour and a half periods. The fuel oil was maintained at about fifty to seventy degrees C. and thorough stirring was employed.

Applicant has also used the oxides of nitrogen in place of nitric acid for this work. He further absorbed the said oxides in carbontetrachloride and the chlorine was also dissolved in the same solvent. The treatment of the fuel oil was then carried out by adding the carbontetrachloride solutions under powerful stirring for simultaneous oxidation and chlorination. Lead nitrate heated to redness was used to generate the oxides of nitrogen. The step described, however, requires the subsequent fractionation of the carbontetrachloride from the chlorinated oil and hence does not offer the full advantages of smooth chlorination which applicant had first expected through such treatment.

About seventy-five grams of the oxides of nitrogen were passed through a thousand grams of the fuel oil and heated to about fifty degrees C. and simultaneously about one hundred grams of chlorine were passed into the same. The above method was employed by applicant for direct chlorination and oxidation without the use of carbontetrachloride.

When using hydrochloric acid for the chlorination work, the nitric acid was found to have been about sixty to sixty-five percent decomposed or utilized in the oxidation step. When using chlorine, about a ninety percent utilization was found. If the oil is heated to about one hundred degrees C., utilization of the nitric acid will be enhanced but the production of tarry or semi-resinous matter is increased.

The oils which I have fabricated were subsequently washed with water and dilute alkali or ammonia.

I also used a thirty percent hydrogen peroxide solution in place of the nitric acid for the oxidation agent. A thousand grams of the oil was similarly heated to fifty or a hundred degrees C., about one hundred and fifty grams of hydrochloric acid were added and two hundred grams of the hydrogen peroxide were slowly added under vigorous stirring of the reaction emulsion. The reaction was also carried out similarly except that chlorine, in place of hydrochloric acid, was slowly run into the oil as the peroxide solution was added.

Ozone would probably act similarly toward production of chlorinated unsaturated hydrocarbons, as well as any other source of chemically active oxygen utilized with chlorine or hydrochloric acid. Nitrosyl and nitroxyl chlorides may also be used fully satisfactorily for production of the oils in question. I have tried out small experiments to establish such point.

I am now testing out the oils fabricated in paints and in film coatings and am using for such work the dryers and polymerizants described in my applications, Serial Numbers 89,463; 100,818; 116,679; 148,960; 168,394; 179,270; 187,897; 206,352; and 212,389.

Naturally, other hydrocarbon oils, as gas oils, other temperatures and pressures, and other percentages of reaction compounds, might be employed. Such combinations might be expanded ad infinitum without departing from the inherent nature of my invention.

I claim:

1. In a process for the chlorination and dehydrogenation of petroleum hydrocarbons to produce unsaturated chlorinated hydrocarbons, the step of treating the said hydrocarbons simultaneously with chlorine and nitric acid at temperatures under one hundred and fifty degrees centigrade.

2. In a process for the chlorination and dehydrogenation of liquid petroleum hydrocarbons to produce unsaturated chlorinated hydrocarbon oils, the step of treating the said hydrocarbons with chlorine and nitric acid at temperatures under one hundred and fifty degres centigrade and simultaneously subjecting the reaction mass to thorough stirring during the reaction period.

3. In a process for the chlorination and dehydrogenation of liquid petroleum hydrocarbons to produce unsaturated chlorinated hydrocarbon oils, the step of treating the said hydrocarbons with chlorine and nitric acid at about seventy degrees centigrade and simultaneously subjecting the reaction mass to thorough stirring during the reaction period.

HERMAN B. KIPPER.